(12) United States Patent
Wakasugi et al.

(10) Patent No.: US 11,014,414 B2
(45) Date of Patent: May 25, 2021

(54) TIRE

(71) Applicant: SUMITOMO RUBBER INDUSTRIES, LTD., Hyogo (JP)

(72) Inventors: Masashi Wakasugi, Hyogo (JP); Daiki Imai, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 128 days.

(21) Appl. No.: 16/185,305

(22) Filed: Nov. 9, 2018

(65) Prior Publication Data

US 2019/0160887 A1 May 30, 2019

(30) Foreign Application Priority Data

Nov. 27, 2017 (JP) .............................. JP2017-226870

(51) Int. Cl.
*B60C 13/02* (2006.01)
*B60C 13/00* (2006.01)

(52) U.S. Cl.
CPC ............ *B60C 13/02* (2013.01); *B60C 13/001* (2013.01)

(58) Field of Classification Search
CPC .............................. B60C 13/02; B60C 13/001
See application file for complete search history.

(56) References Cited

U.S. PATENT DOCUMENTS

2015/0041037 A1* 2/2015 Mukai .................... B60C 13/02
152/523

FOREIGN PATENT DOCUMENTS

JP 2015-033983 A 2/2015
JP WO 2015/029928 * 3/2015 ........... B60C 13/001

OTHER PUBLICATIONS

English Translation of WO 2015/029928 (Year: 2015).*

* cited by examiner

*Primary Examiner* — Timothy Kennedy
*Assistant Examiner* — Olukorede Esan
(74) *Attorney, Agent, or Firm* — Greenblum & Bernstein, P.L.C.

(57) ABSTRACT

A tire sidewall portion is provided with a circumferentially extending decorative zone which comprises a serrated region formed from ridges extending in a radial direction and arranged side by side in the tire circumferential direction. The ridges include continuous ridges and discontinuous ridges with a discontinuity part. A diagonal pattern is formed by discontinuity-pattern elements each formed from the discontinuity parts of the discontinuous ridges positioned adjacently in the tire circumferential direction. In the diagonal pattern, one of the continuous ridges is disposed between every two of the adjacent discontinuity-pattern elements.

20 Claims, 4 Drawing Sheets

TIRE

TECHNICAL FIELD

The present invention relates to a tire provided in a sidewall portion with a decorative zone including a serrated region composed of ridges.

BACKGROUND ART

It has been known that, when a pneumatic tire is vulcanization-molded, air is liable to be trapped between the vulcanization mold and the tire, and thereby bareness of rubber occurs on the surface of the tire, for example, on the surface of the tire sidewall portions.
Also it has been known that, on the surface of tire sidewall portions, radially extending bulge and dent occur due to lap splicing of the carcass ply and the like.

Therefore, a tire sidewall portion is usually provided with a decorative zone of a serration pattern which is formed by ridges extending in a radial direction and arranged side by side in the tire circumferential direction. Such ridges are molded by small grooves formed in the inner surface of the vulcanization mold, and the small grooves facilitate to remove the trapped air. As a result, the occurrence of bareness of rubber is suppressed. Also, the serration pattern can make the bulge and dent less noticeable.

On the other hand, in the marketplace, in recent years, there has been an increasing demand for tires having good-looking designs by giving more visible variations in the pattern to a decorative zone of the tire sidewall portion.

However, in the conventional serration pattern, the direction of the ridges is restricted in the tire radial direction or at small angles with respect to the tire radial direction in order to provide the air exhaust function, therefore, the change in the pattern is less, and it is difficult to satisfy the market demand.

The following Patent Document 1 discloses a tire provided with a decorative zone of a serration pattern, wherein the serration pattern is formed by a first ridge extending straight along its entire length, and a second ridge which is straight for the most part but bent in the middle thereof. In terms of improving the design by visually varying the pattern, there is still room for improvement.

Patent Document 1: Japanese Unexamined Patent Publication No. 2015-033983

SUMMARY OF THE INVENTION

Problems to be Solved by the Invention

It is therefore, an object of the present invention to provide a tire, in which, by providing visual variations to a serration pattern, the design of the tire is improved without sacrificing the effect of the serration pattern suppressing air trapping and the occurrence of bulge and dent.

According to the present invention, a tire comprises:
a sidewall portion provided with a decorative zone extending in the tire circumferential direction,
the decorative zone comprising a serrated region formed from ridges arranged side by side in the tire circumferential direction,
the ridges including continuous ridges each extending continuously in a radial direction, and discontinuous ridges each extending discontinuously in the radial direction to have a discontinuity part in the middle thereof,
wherein
the serrated region comprises a diagonal pattern made up of discontinuity-pattern elements which are arranged from the radially inside toward the radially outside of the tire, while inclining toward one side in the tire circumferential direction,
each of the discontinuity-pattern elements is formed from the discontinuity parts of the discontinuous ridges positioned adjacently in the tire circumferential direction, and
in the diagonal pattern, at least one of the continuous ridges is disposed between every two of the adjacent discontinuity-pattern elements.

Further, the tire according to the present invention may have the following features (1)-(5):
(1) in each of the discontinuity-pattern elements, the radially outer ends of the discontinuity parts defining the discontinuity-pattern element are positioned on a circumferential line;
(2) in each of the discontinuity-pattern elements, the radially inner ends of the discontinuity parts defining the discontinuity-pattern element are positioned on a circumferential line;
(3) in each of the discontinuity-pattern elements, the radially outer ends of the discontinuity parts defining the discontinuity-pattern element are positioned on a circumferential line, and the radially inner ends of the discontinuity parts defining the discontinuity-pattern element are positioned on another circumferential line, whereby the discontinuity-pattern element is formed in a parallelogram shape;
(4) in the diagonal pattern, ratios Wx/Wy of the discontinuity-pattern elements are gradually increased toward the radially outside of the tire, wherein Wx is the width in the tire circumferential direction of the discontinuity-pattern element, and Wy is the width in the tire radial direction of the discontinuity-pattern element;
(5) in the diagonal pattern, only one of the continuous ridges is disposed between every two of the adjacent discontinuity-pattern elements.

Therefore, in the tire according to the present invention, as the decorative zone includes the serrated region in which the ridges are arranged side by side in the tire circumferential direction, the effect suppressing the air trapping and the occurrence of bulge and dent can be exhibited to a high degree.

The diagonal pattern formed by the obliquely arranged discontinuity-pattern elements, gives changes to the serration pattern since the portion with the ridges and the portions without the ridges (namely, discontinuity-pattern elements) can produce strong and weak light reflection to the eye.

The diagonal pattern can be emphasized by giving regularity to the arrangement of the discontinuity-pattern elements.

Each discontinuity-pattern element formed by the discontinuity parts of the circumferentially adjacent discontinuous ridges, can make its area larger.

In the diagonal pattern including the continuous ridges disposed between the circumferentially adjacent discontinuity-pattern elements, the boundaries between the discontinuity-pattern elements become clear, and the function to escape trapped air is provided.

According to the present invention, due to the synergistic effect of the above, it is possible to enhance the visibility of the diagonal pattern in order to make the decorative zone impressive, further enhance the effect making bulge and dent less noticeable, and further improve the design.

DESCRIPTION OF THE PREFERRED EMBODIMENTS

Embodiments of the present invention will now be described in detail in conjunction with accompanying drawings.

The tire 1 according to the present invention comprises a pair of sidewall portions 2 at least one of which is provided in the outer surface 2S with a decorative zone 3 extending in the tire circumferential direction.

Figure 1:
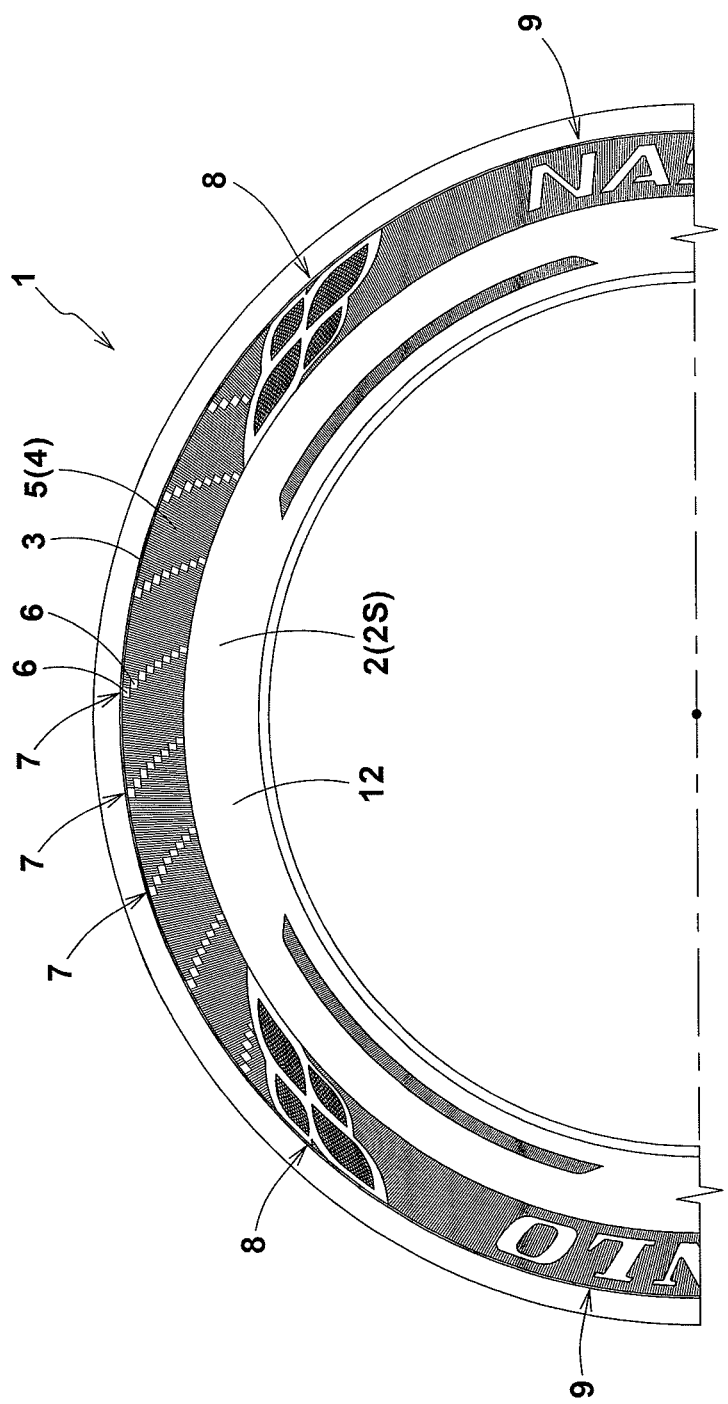
FIG. 1 is a partial side view of a tire as an embodiment of the present invention.

In the example shown in FIG. 1, the decorative zone 3 extends continuously in the tire circumferential direction to form an annular ring shape concentric with the tire rotational axis. Further, on the radially inside of the decorative zone 3, there is formed an annular information zone 12 in which tire information (not shown), e.g. the tire size, tire identification number and the like are indicated.

The decorative zone 3 includes a serrated region 5 having a serration pattern formed from ridges 4 arranged side by side in the tire circumferential direction.
In this example, the serrated region 5 is formed over the substantially entire area of the decorative zone 3.

The serrated region 5 is provided with at least one diagonal pattern 7 formed by discontinuity-pattern elements 6 which are arranged in an inclined manner.
In this example, in addition to the diagonal patterns 7, the serrated region 5 is further provided with a third pattern 9 representing characters showing the manufacturer, brand name and the like.

Figure 2:
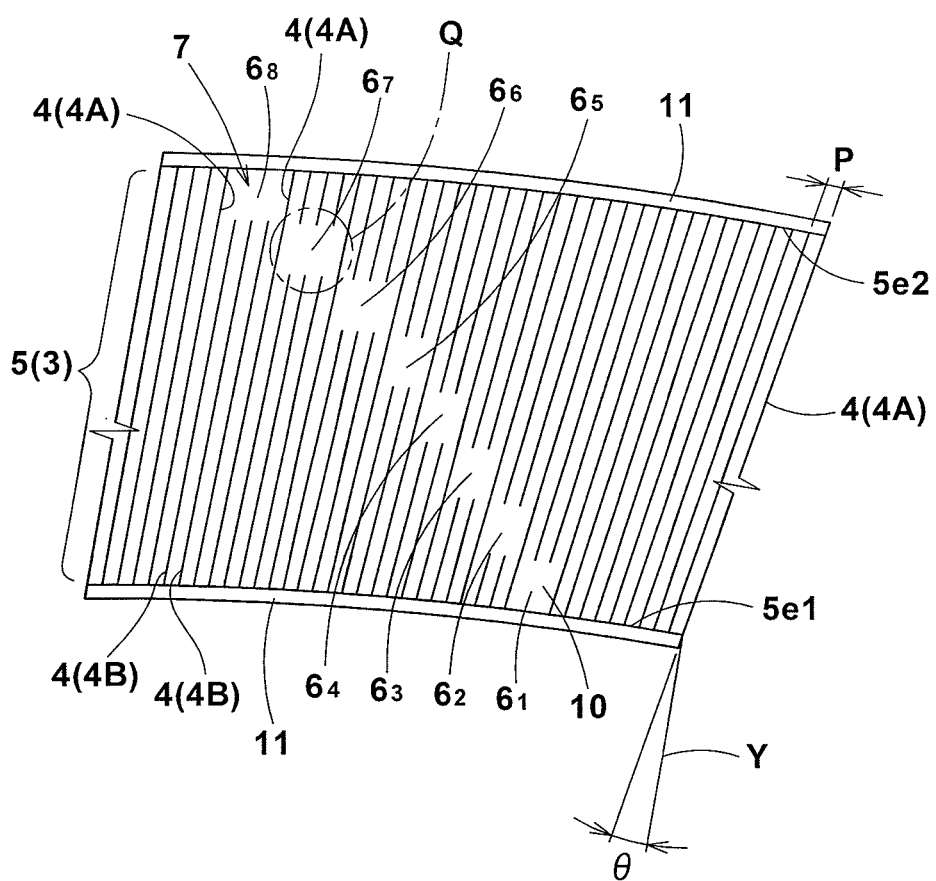
FIG. 2 is a partial side view of the tire showing one of the diagonal patterns in the serrated region.

In FIG. 2, one of the diagonal patterns 7 is schematically shown.

As shown, the ridges 4 forming the serrated region 5 extend in respective radial directions.
Here, the expression "extend in respective radial directions" means each ridge 4 extends at an angle θ of from 0 to 20 degrees with respect to a radial-direction line Y drawn in the tire radial direction at the radially inner end of the ridge.

In the example shown in FIG. 2, each of the ridges 4 is inclined at an angle θ of from 5 to 15 degrees.

The ridges 4 are arranged in the tire circumferential direction at pitches P which are preferably in a range from 0.2 to 0.5 degrees in terms of the central angle around the tire rotational axis.

Figure 3:
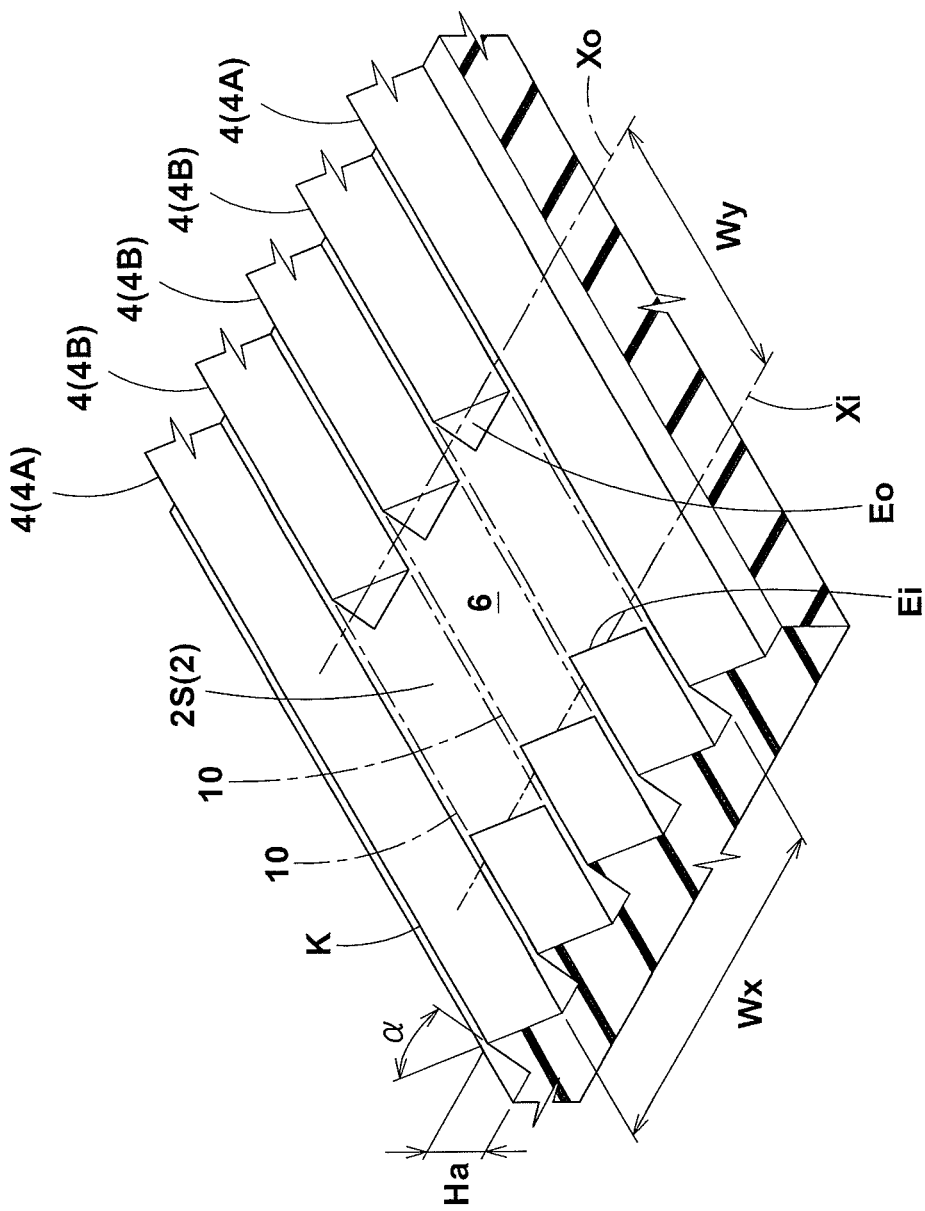
FIG. 3 is an enlarged perspective view of part Q of FIG. 2 showing one of the discontinuity-pattern elements.

FIG. 3 is an enlarged perspective view of part Q of FIG. 2 showing one of the discontinuity-pattern elements 6.

As shown, each ridge 4 protrudes from the surface 2S of the sidewall portion 2 at a small height Ha and has a small width, and all the ridges 4 have an identical cross-sectional shape. As to the cross-sectional shape, for example, an isosceles triangle having an apex angle α of from 50 degrees to 90 degrees is preferably adopted, although various cross-sectional shapes such as scalene triangle and trapezoids may be adopted, depending on requirements.
For example, the height Ha of the ridges 4 is set in a range from 0.2 to 0.6 mm.

In FIGS. 1 and 2, for the sake of convenience, each ridge 4 is shown by the ridge line K at the top.

The ridges 4 include continuous ridges 4A each extending continuously in a radial direction, and discontinuous ridges 4B each extending discontinuously in the radial direction to have a discontinuity part 10 in the middle in the length direction.

As shown in FIG. 2, the continuous ridges 4A extend continuously from the radially inner edge 5e1 to the radially outer edge 5e2 of the serrated region 5.

Preferably, the inner edge 5e1 and the outer edge 5e2 are each defined by a circumferential rib 11 of a small width which protrudes at a small height Hb from the surface 2S of the sidewall portion 2. It is preferable that the height Hb is set to be larger than the height Ha of the ridge 4, for example, about 0.2 to 0.4 mm larger than the height Ha.

On the other hand, the discontinuous ridges 4B each have one or more discontinuity parts 10 (in this example, only one discontinuity part 10) in the middle in the length direction.

In the case where the continuous ridges 4A extend continuously from the radially inner edge 5e1 to the radially outer edge 5e2 of the serrated region 5, some of the discontinuous ridges 4B may have the discontinuity parts 10 not in the middle in the length direction, namely, at one end or the other end in the length direction, more specifically, such discontinuous ridge 4B extends from one of the inner edge 5e1 and the outer edge 5e2 toward the other and terminates without reaching the other so that the discontinuity part 10 is formed adjacently to the other edge as shown in FIG. 2.

Each of the diagonal patterns 7 is formed from discontinuity-pattern elements 6 which are arranged diagonally from the radially inside toward the outside of the tire, inclining toward one side in the tire circumferential direction. Further, in each diagonal pattern 7, at least one of the continuous ridges 4A is arranged between every two of the circumferentially adjacent discontinuity-pattern elements 6.

In this way, by giving regularity to the arrangement of the discontinuity-pattern elements 6, the diagonal pattern 7 can be emphasized, and its visibility and design can be enhanced. Also, by the continuous ridges 4A disposed between the adjacent discontinuity-pattern elements 6, the boundary of each discontinuity-pattern element 6 becomes clear and the diagonal pattern 7 can be clarified.

With increase in the number of the continuous ridges 4A arranged between the two adjacent discontinuity-pattern elements 6, the impression of the diagonal pattern 7 becomes weakened and the visibility decreases. Therefore, it is preferable that this number is one.

In the embodiment shown in FIG. 1, the serrated region 5 is provided with a plurality of the diagonal patterns 7 which are arranged in the tire circumferential direction. In this case, it is preferable that, between the circumferentially adjacent diagonal patterns 7, a plurality (e.g., 5 to 15) of the continuous ridges 4A are arranged. As a result, the diagonal patterns 7 are clearly distinguished from each other, and the visibility and design are improved.

Each of the discontinuity-pattern elements 6 is formed by the discontinuity parts 10 of the discontinuous ridges 4B which are adjacent in the tire circumferential direction as shown in FIG. 3. Therefore, the surface of the discontinuity-pattern element 6 is formed by a part of the surface 2S of the sidewall portion 2, in other words, the surface of the discontinuity-pattern element 6 is at the same level as the surface 2S of the sidewall portion 2.

In each of the discontinuity-pattern elements 6, it is preferable that the radially outer ends Eo of the discontinuity parts 10 defining the discontinuity-pattern elements 6 are positioned on a circumferential line Xo, and/or the radially inner ends Ei of the discontinuity parts 10 defining the discontinuity-pattern elements 6 are positioned on a circumferential line Xi.

In this example, both of the radially outer ends Eo and the radially inner ends Ei are positioned as explained above. As a result, the discontinuity-pattern element 6 is formed in a parallelogram shape. Incidentally, when the above-mentioned angles θ of the ridges 4 are 0 degrees, the parallelogram shape becomes a rectangular shape (including a square shape).

When the angles θ of the ridges 4 are larger than 0 degrees, it is preferable that the inclining direction toward which the ridges 4 are inclined (toward the above-said one side in the tire circumferential direction) is opposite to the inclining direction toward which the arrangement of the discontinuity-pattern elements 6 is inclined (toward the other side in the tire circumferential direction).

In the example shown in FIG. 2, the ridges 4 are inclined to the right, and the arrangement of the discontinuity-pattern elements 6 is inclined to the left.

As a result, the visible variations in the pattern is increased, which can further contribute to the improvement of the design.

In each diagonal pattern 7, when the discontinuity-pattern elements 6 have parallelogram shapes, it is preferable that the discontinuity-pattern elements 6 are gradually increased toward the radially outside of the tire with respect to the ratio Wx/Wy of the circumferential-direction width Wx (shown in FIG. 3) to the radial-direction width Wy (shown in FIG. 3) of the discontinuity-pattern element 6.

More specifically, in the case of the example shown in FIG. 2, one diagonal pattern 7 is formed from eight discontinuity-pattern elements $6_1$ to $6_8$, wherein the ratios Wx/Wy of the first to fifth discontinuity-pattern elements $6_1$ to $6_5$ from the radially inside to the outside have an identical value A, and
the ratios Wx/Wy of the sixth to eighth discontinuity-pattern elements $6_6$ to $6_8$ have an identical value B which is larger than the value A.

Accordingly, in this example, the ratios Wx/Wy of the discontinuity-pattern elements 6 are increased in one step. However, it is also possible to increase the ratios Wx/Wy in two or more steps or every discontinuity-pattern elements 6.

It is preferable that the radially innermost discontinuity-pattern element 6 has a radially elongated shape where the ratios Wx/Wy is smaller than 1.0, and the radially outermost discontinuity-pattern elements 6 has a circumferentially elongated shape where the ratios Wx/Wy is larger than 1.0. As a result, the shape change of the discontinuity-pattern elements 6 in the diagonal pattern 7 can be more clearly recognized, and the diagonal pattern 7 can be made more noticeable.

In the discontinuity-pattern elements 6 in this example, their radial-direction widths Wy have an identical value, but the circumferential-direction widths Wx are changed.
It is also possible that the circumferential-direction widths Wx have an identical value, but the radial-direction widths Wy are changed, or the circumferential-direction widths Wx and the radial-direction widths Wy are both changed.

In the embodiment shown in FIG. 1, the serrated region 5 is provided with a mesh pattern 8. Preferably, the mesh pattern 8 is formed adjacently to the diagonal pattern 7. Preferably, a plurality of the mesh patterns 8 are arranged in the tire circumferential direction. More preferably, between the mesh patterns 8, a plurality of the diagonal patterns 7 are formed.

Figure 4:
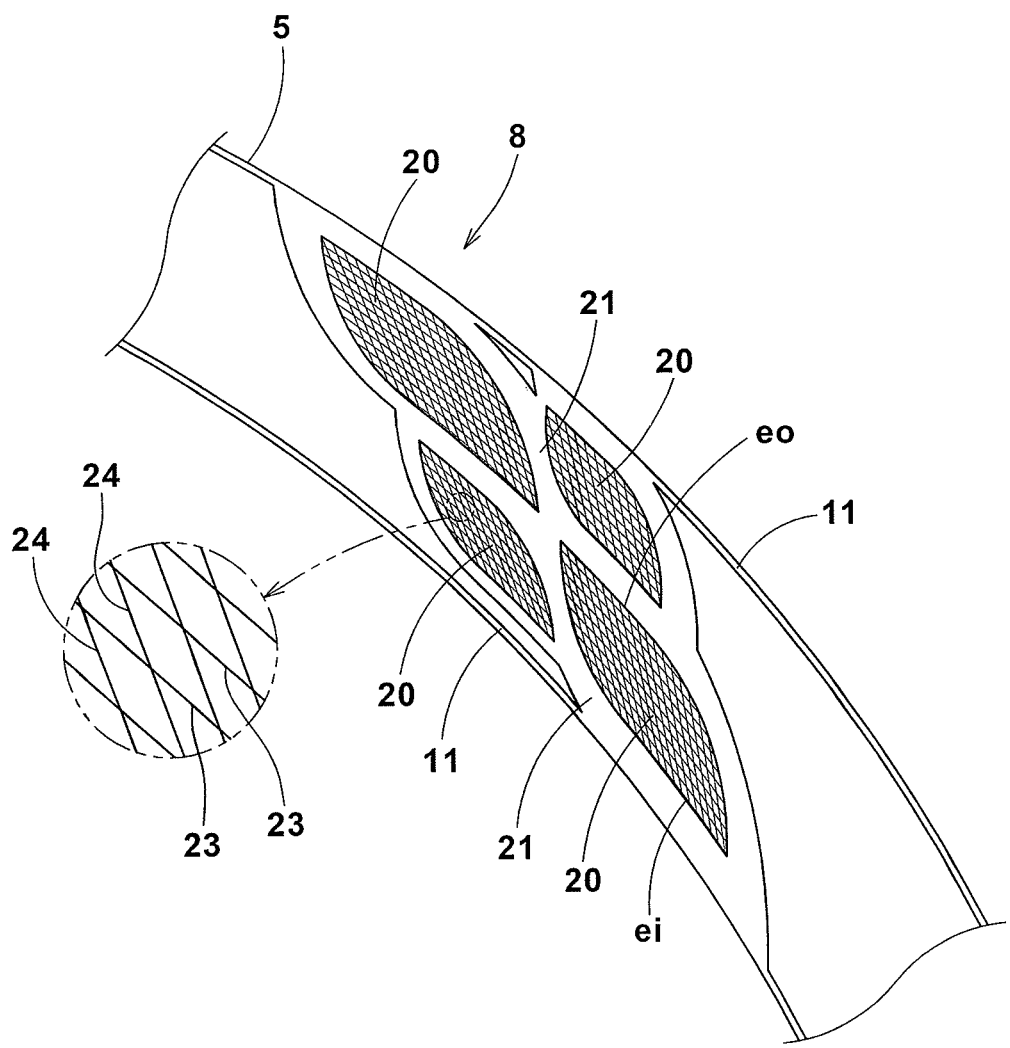
FIG. 4 is a schematic partial side view

FIG. 4 shows an example of the mesh pattern 8, omitting the ridges 4. As shown, the mesh pattern 8 in this example is made up of four cross-ridge areas 20.

In this example, each of the cross-ridge areas 20 has a circumferentially elongated substantially parallelogram shape having a radially inner side ei and a radially outer side eo each being a circular arc concentric with the above-said circumferential ribs 11.

Each of the cross-ridge areas 20 is surrounded by an edging portion 21. The edging portion 21 in this example is flat and formed to have the same height as the circumferential ribs 11.

Each of the cross-ridge areas 20 is formed by circumferential ridges 23 extending in the tire circumferential direction, and radial ridges 24 intersecting the circumferential ridges 23 to have a mesh pattern.

The circumferential ridges 23 and the radial ridges 24 protrude from the surface 2S of the sidewall portion 2 at a small height and have a small width in the same manner as the ridges 4. In this example, the ridges 23 and 24 have the same cross-sectional shape as the ridges 4.

Further, in this example, the radial ridges 24 of all the cross-ridge areas 20 are inclined toward one side in the tire circumferential direction from the radially inside to the radially outside of the tire (to the left in the figures), which inclining direction is opposite to that of the ridges 4 when the above-said angle θ is more than zero (to the right in the figures). Even when the above-said angle θ is zero, the radial ridges 24 extend in a difficult direction than the ridge 4. Thus, the cross-ridge areas 20 provide a distinguishable mesh pattern within the serration pattern, therefore, the visible variations in the pattern is felt greatly, and the design can be further enhanced.

While detailed description has been made of a preferable embodiment of the present invention, the present invention can be embodied in various forms without being limited to the illustrated embodiment.

Comparison Tests

In order to confirm the effects of the present invention, pneumatic tires of size 195/65R15 having decorative zones based on the decorative zone 3 shown in FIG. 1 were experimentally manufactured as test tires (Ex. 1. Ex. 2 and Ex. 3).

Also, a pneumatic tire was prepared as Comparative Example tire Ref. 1, in which, instead of the diagonal pattern 7 according to the present invention, an inclined pattern shown in FIG. 7 of the Patent Document 1 was formed.

The specifications of the decorative zones are shown in Table 1. All the test tires had the same structure except for the specifications shown in Table 1.

The continuous ridges 4A, the discontinuous ridges 4B, the circumferential ridges 23 and the radial ridges 24 all had the same cross sectional shape of an isosceles triangle with the apex angle α of 60 degrees and the height Ha of 0.4 mm. The angle θ of the continuous ridges 4A and the discontinuous ridges 4B was 10 degrees.

Then, the follows tests were carried out on the test tires.
<Design Test>

100 examining staff visually observed each test tire one meter away from the sidewall portion, and evaluated the degree of visibility of the decorative zone and the visible variation of the serration pattern into five ranks, wherein the higher the rank number is, the better the visibility is, and the larger the visible variation is, namely, the better the design is.
<Bulge and Dent Test>
In each test tire, with a lap splicing joint (8 mm in width) of the carcass ply, bulge and dent were formed in the outer surface of the sidewall portions. Such outer surface was evaluated by the 100 examining staff into five ranks as follows.
Rank 5: It was difficult to know the presence of the bulge and dent visually and also by means of touch.
Rank 4: it was difficult to know the presence of the bulge and dent visually.
Rank 3: it was possible to know the presence of the bulge and dent visually, but it was almost inconspicuous.
Rank 2: It was easy to know the presence of the bulge and dent visually.
Rank 1: The bulge and dent were very noticeable.

TABLE 1

| Tire | Ref. 1 | Ex. 1 | Ex. 2 | Ex. 3 | Ref. 2 |
| --- | --- | --- | --- | --- | --- |
| serrated region | present | present | present | present | present |
| continuous ridges | present | present | present | present | present |
| discontinuous ridges | present | present | present | present | present |
| diagonal discontinuity pattern | present | present | present | present | present |
| inclination | present | present | present | present | absent |
| number of discontinuity part(s) defining each discontinuity-pattern element | 1 | 3-4 | 3-4 | 3-5 | 5 |
| number of continuous ridge(s) between discontinuity-pattern elements | 0 | 1 | 2 | 1 | 2 |
| discontinuity-pattern element shape | — | parallelogram | parallelogram | parallelogram | circle |
| maximum to minimum of Wx/Wy *1 | — | 1.3 | 1.3 | 1.7 | — |
| mesh pattern | present | present | present | present | present |
| design | 3 | 3.4 | 3.3 | 3.5 | 2.6 |
| Bulge and dent | 2.3 | 3.1 | 3.1 | 3.2 | 2.5 |

*1 Ratios Wx/W were gradually increased toward radially outside

DESCRIPTION OF THE REFERENCE SIGNS

1 tire
2 sidewall portion
2S surface of sidewall portion
3 decorative zone
4 ridge
4A continuous ridge
4B discontinuous ridge
5 serrated region
6 discontinuity-pattern element
7 diagonal pattern
10 discontinuity part
Ei radially inner end of discontinuity part
Eo radially outer end of discontinuity part
Xi circumferential line
Xo circumferential line
Y radial-direction line

The invention claimed is:

1. A tire comprising:
a sidewall portion provided with a decorative zone extending in a tire circumferential direction,
the decorative zone comprising a serrated region formed from ridges arranged side by side in the tire circumferential direction,
the ridges including continuous ridges each extending continuously in a radial direction, and discontinuous ridges each extending discontinuously in the radial direction to have a discontinuity part in a middle thereof,
wherein
the serrated region comprises a diagonal pattern made up of discontinuity-pattern elements which are arranged from a radially inside toward a radially outside of the tire while inclining toward one side in the tire circumferential direction,
each of the discontinuity-pattern elements is formed from the discontinuity parts of the discontinuous ridges positioned adjacently in the tire circumferential direction, and
in the diagonal pattern, at least one of the continuous ridges that extends continuously from a radial inner edge of the serrated region to a radial outer edge of the serrated region is disposed between every two of the adjacent discontinuity-pattern elements that are positioned along a same diagonal line of the diagonal pattern.

2. The tire according to claim 1, wherein
in each of the discontinuity-pattern elements, radially outer ends of all the discontinuity parts defining a respective one of the discontinuity-pattern elements are positioned on a circumferential line.

3. The tire according to claim 1, wherein
in each of the discontinuity-pattern elements, radially inner ends of all the discontinuity parts defining a respective one of the discontinuity-pattern elements are positioned on a circumferential line.

4. The tire according to claim 1, wherein
in each of the discontinuity-pattern elements,
radially outer ends of all the discontinuity parts defining a respective one of the discontinuity-pattern elements are positioned on a circumferential line, and
radially inner ends of all the discontinuity parts defining a respective one of the discontinuity-pattern elements are positioned on another circumferential line, whereby
each of the discontinuity-pattern elements is formed in a parallelogram shape.

5. The tire according to claim 4, wherein
in the diagonal pattern, ratios Wx/Wy of the discontinuity-pattern elements are gradually increased toward the radially outside of the tire, wherein
Wx is the width in the tire circumferential direction of one of the discontinuity-pattern elements, and
Wy is the width in the tire radial direction of said one of the discontinuity-pattern elements.

6. The tire according to claim 1, wherein
in the diagonal pattern, only one of the continuous ridges is disposed between every two of the adjacent discontinuity-pattern elements.

7. The tire according to claim 2, wherein
in the diagonal pattern, only one of the continuous ridges is disposed between every two of the adjacent discontinuity-pattern elements.

8. The tire according to claim 3, wherein
in the diagonal pattern, only one of the continuous ridges is disposed between every two of the adjacent discontinuity-pattern elements.

9. The tire according to claim 5, wherein
in the diagonal pattern, only one of the continuous ridges is disposed between every two of the adjacent discontinuity-pattern elements.

10. The tire according to claim 1, wherein
the ridges include second discontinuous ridges each extending from one of the radial inner edge and the radial outer edge of the serrated region toward an other edge of the radial inner edge and the radial outer edge and terminates without reaching the other edge so that a discontinuity part is formed adjacently to the other edge.

11. The tire according to claim 10, wherein
the radial inner edge and the radial outer edge of the serrated region are each defined by a circumferential rib.

12. The tire according to claim 1, wherein
each of the ridges extends at an angle of from 0 to 20 degrees with respect to a radial-direction line drawn in the radial direction of the tire at a radially inner end of a respective one of the ridges.

13. The tire according to claim 1, wherein
the ridges are arranged in the tire circumferential direction at pitches of from 0.2 to 0.5 degrees in terms of a central angle around a tire rotational axis.

14. The tire according to claim 1, wherein
all the ridges have an identical cross-sectional shape which is one of an isosceles triangle having an apex angle $\alpha$ of from 50 to 90 degrees, a scalene triangle, and a trapezoid, and which have a height in a range from 0.2 to 0.6 mm.

15. The tire according to claim 1, wherein
the serrated region is provided with a plurality of the diagonal patterns arranged at intervals in the tire circumferential direction, all of which are inclined toward said one side in the tire circumferential direction.

16. The tire according to claim 5, wherein
widths Wx of the discontinuity-pattern elements in the tire circumferential direction are changed, and
widths Wy of the discontinuity-pattern elements in the radial direction have an identical value.

17. The tire according to claim 5, wherein
widths Wx of the discontinuity-pattern elements in the tire circumferential direction have an identical value, and
widths Wy of the discontinuity-pattern elements in the radial direction are changed.

18. The tire according to claim 5, wherein
widths Wx of the discontinuity-pattern elements in the tire circumferential direction are changed, and
widths Wy of the discontinuity-pattern elements in the radial direction are changed.

19. A tire comprising:
a sidewall portion provided with a decorative zone extending in a tire circumferential direction,
the decorative zone comprising a serrated region formed from ridges arranged side by side in the tire circumferential direction,
the ridges including continuous ridges each extending continuously in a radial direction, and discontinuous ridges each extending discontinuously in the radial direction to have a discontinuity part in a middle thereof,
wherein
the serrated region comprises a diagonal pattern made up of discontinuity-pattern elements which are arranged from a radially inside toward a radially outside of the tire while inclining toward one side in the tire circumferential direction,
each of the discontinuity-pattern elements is formed from the discontinuity parts of the discontinuous ridges positioned adjacently in the tire circumferential direction, and
in the diagonal pattern, at least one of the continuous ridges that extends continuously from a radial inner edge of the serrated region to a radial outer edge of the serrated region is disposed between every two of the adjacent discontinuity-pattern elements, wherein
in each of the discontinuity-pattern elements, radially outer ends of all the discontinuity parts defining a respective one of the discontinuity-pattern elements are positioned on a circumferential line.

20. A tire comprising:
a sidewall portion provided with a decorative zone extending in a tire circumferential direction,
the decorative zone comprising a serrated region formed from ridges arranged side by side in the tire circumferential direction,
the ridges including continuous ridges each extending continuously in a radial direction, and discontinuous ridges each extending discontinuously in the radial direction to have a discontinuity part in a middle thereof,
wherein
the serrated region comprises a diagonal pattern made up of discontinuity-pattern elements which are arranged from a radially inside toward a radially outside of the tire while inclining toward one side in the tire circumferential direction,
each of the discontinuity-pattern elements is formed from the discontinuity parts of the discontinuous ridges positioned adjacently in the tire circumferential direction, and
in the diagonal pattern, at least one of the continuous ridges that extends continuously from a radial inner edge of the serrated region to a radial outer edge of the serrated region is disposed between every two of the adjacent discontinuity-pattern elements, wherein
in each of the discontinuity-pattern elements, radially inner ends of all the discontinuity parts defining a respective one of the discontinuity-pattern elements are positioned on a circumferential line.

* * * * *